Dec. 6, 1966     P. J. KOOLE     3,289,659
ENGINE CONTROL DEVICE

Filed March 16, 1964     2 Sheets-Sheet 2

INVENTOR.
PETER J. KOOLE
BY
Meyer, Baldwin, Doran & Egan
ATTORNEYS

ENGINE CONTROL DEVICE
Peter J. Koole, Rocky River, Ohio, assignor to The Standard Products Company, Cleveland, Ohio, a corporation of Ohio
Filed Mar. 16, 1964, Ser. No. 352,050
2 Claims. (Cl. 123—97)

This invention relates generally to engine control devices and, more particularly, to an engine control device which is especially designed for use with the carburetor and distributor components of an internal combustion engine, and which device is operable to provide an overall high engine efficiency under all conditions of engine operation.

As is well known, when a combustible fuel such as gasoline, commonly in use today, is supplied to an internal combustion engine for ignition therein, it is required to be carbureted or mixed with a predetermined amount of air, which mixture of fuel and air is generally referred to as "carbureted fuel." This carbureted fuel provides an explosive mixture which, when fed into the engine is ignited so as to provide sufficient energy to run the same. As is likewise well known, the amount of energy per volume of "carbureted fuel" is directly related to the ratio of fuel to air in said mixture.

It has previously been determined that in a carbureted fuel mixture containing approximately 15 parts of air to 1 part gasoline fuel of present day standards proportioned by weight, a combustible mixture will be obtained which, when applied to and ignited in an internal combustion engine maximum efficiency of operation of the engine will be obtained.

As will be further recognized, an internal combustion engine that is used in an automotive vehicle or the like is required to operate under various load conditions, and consequently, a carbureter designed for use with said engine should be capable of supplying the proper mixture of fuel and air as above defined to said engine for all conditions of operation and also during the transitional periods during which the engine is changing from one operational condition to another.

For example, assuming that the vehicle is running at a somewhat higher speed than the "idle speed" which may be hereinafter defined as a "cruising speed," and it is then desired to decelerate said vehicle, the engine carbureter controls are actuated to return the conventional carburetor to its idle position preparatory to decreasing the vehicle speed.

When the engine is to be decelerated, and the carbureter is returned to its idle condition, the carbureter is normally incapable of thereafter providing sufficient air to mix with the fuel during the deceleration of the engine. Consequently, the by-products of combustion during this deceleration period contain a greater proportion of hydrocarbons, unburned fuel and other volatile products than would otherwise be present if proper carburetion were obtained. This is the basic problem to which the present invention is directed.

Internal combustion engines in use today, for example in automobiles or the like, have been provided with many types of control elements or devices that function with the engine in an attempt to effect an efficient carburetion of the fuel and air and the ignition of the resultant fuel mixture throughout substantially all conditions of engine operation, especially during deceleration.

One of the types of carbureter control devices to which I have reference and which is generally the type of device to which the subject matter of my invention pertains is disclosed in United States Patent 2,988,074 and is seen to operate in conjunction with a conventional downdraft type of carbureter and also with a rotary adjustable type of distributor to control the carburetion of the fuel and air mixture, and the timing for igniting said fuel mixture.

In this type of control device, it has been the practice to connect the control elements thereof to the engine in such manner that they are responsive to the variations in one or more conditions within the engine such as, for example, the changes occurring in the vacuum in the intake manifold.

The principal of operation of engine control devices of this type is based upon the fact that when the engine is operating at a cruising or idle speed, the intake manifold vacuum may have a magnitude of between ten and fifteen inches of mercury and, when the engine is in a deceleration transitional period or condition, the manifold vacuum rises substantially instantly to a value of approximately twenty-two inches of mercury, and then decreases progressively to its idle magnitude as the engine speed decreases.

This variation in the manifold vacuum is monitored by the control elements of the control device in an attempt to regulate the carburetion of the fuel and the timing of its ignition as it is introduced into the engine.

A distinct disadvantage in prior control devices of this type has been their inability to provide a stable control of the carburetion of the fuel and air and likewise of the timing of the ignition of the ignitable mixture during the later part of the deceleration transitional cycle and particularly just prior to the engine reaching its idle speed.

This is because the control device provides an adjustment to the carbureter and distributor in response to the monitored change occurring in the intake manifold vacuum which adjustment, in turn, causes a further change to occur in the vacuum magnitude. This further change in manifold vacuum, in turn, causes a responsive adjustment to be made in the carbureter and distributor, thus causing a continuous cyclic control to occur. As a result, the control device "hunts" a condition of equilibrium, and as above mentioned, this hunting is more prominent during the latter part of the deceleration transitional cycle. Consequently, the engine tends to accelerate in response to the carbureter and distributor adjustment, thus making the vehicle lurch as it is approaching its "idle speed" and hence requires that the operator continuously brake the vehicle until it is brought to a stop.

These and other disadvantages of prior systems for controlling the carburetion of an internal combustion engine during deceleration or coasting have been overcome by the present invention which is directed toward an improved control device for such an engine wherein the optimum burning of hydrocarbons is approached during deceleration and/or coasting.

In accordance with the present invention, there is provided an improvement in a control device for an internal combustion engine having a vacuum responsive system for opening the throttle valve slightly and retarding the ignition during deceleration or coasting. This improvement includes the provision of a conduit means for communicating the vacuum motors of the vacuum responsive system with a source of pressurized air, such as atmospheric air, a valve means in the conduit and responsive to the speed of the engine with the valve means being closed at all speeds above a preselected control speed slightly higher than a preselected idle speed for the engine and being opened at all speeds below the control speed whereby the vacuum motors of the system are inoperative below the control speed.

In this manner, the vacuum control system is operative until the idle speed of the engine is approached, thereafter the system is inoperative. This prevents hunting, and eliminates the variables caused by the non-linear effect of vacuum-versus-speed as the engine speed approaches the idle speed of the engine.

In accordance with another aspect of the present invention there is provided an improvement in a control device for an internal combustion engine having a vacuum responsive system for opening the throttle valve slightly and retarding the ignition during deceleration or coasting. This improvement includes the provision of a valve means closed when the throttle control rod is moved in the acceleration direction and opened when the rod is moved into the engine idle position, this valve means is positioned between the intake manifold of the engine and the vacuum motor means of the control system so that the motor means is inoperative when the valve means is closed.

By this construction, the control system is positively controlled by the movement of the throttle control rod without requiring complicated linkages which can become erratic by vibrations of the engine or vehicle onto which the engine is mounted.

It is therefore a primary object of the present invention to provide an engine control device which is especially designed for use with a conventional downdraft type of carbureter and an adjustable rotary type of distributor and which device is operable to regulate the carburetion of the ignitable fuel and the timing of the ignition of said fuel as it is delivered to the engine so as to provide substantially high engine efficiency and control thereof under all conditions of engine operation.

Another object of the present invention is to provide a novel and improved engine control device as is defined in the last preceding object and which device is operable to provide a stable control, particularly during the deceleration cycle when the engine is decelerating to its "idle" speed so that optimum burning of the combustible mixture is maintained throughout said deceleration cycle and subsequently at said idle speed.

Additional objects and advantages of the engine control device of the present invention will be apparent to one skilled in the art to which it pertains, and particularly upon reference to the following disclosure of a preferred embodiment thereof as is illustrated in the accompanying drawings wherein.

Figure 1:
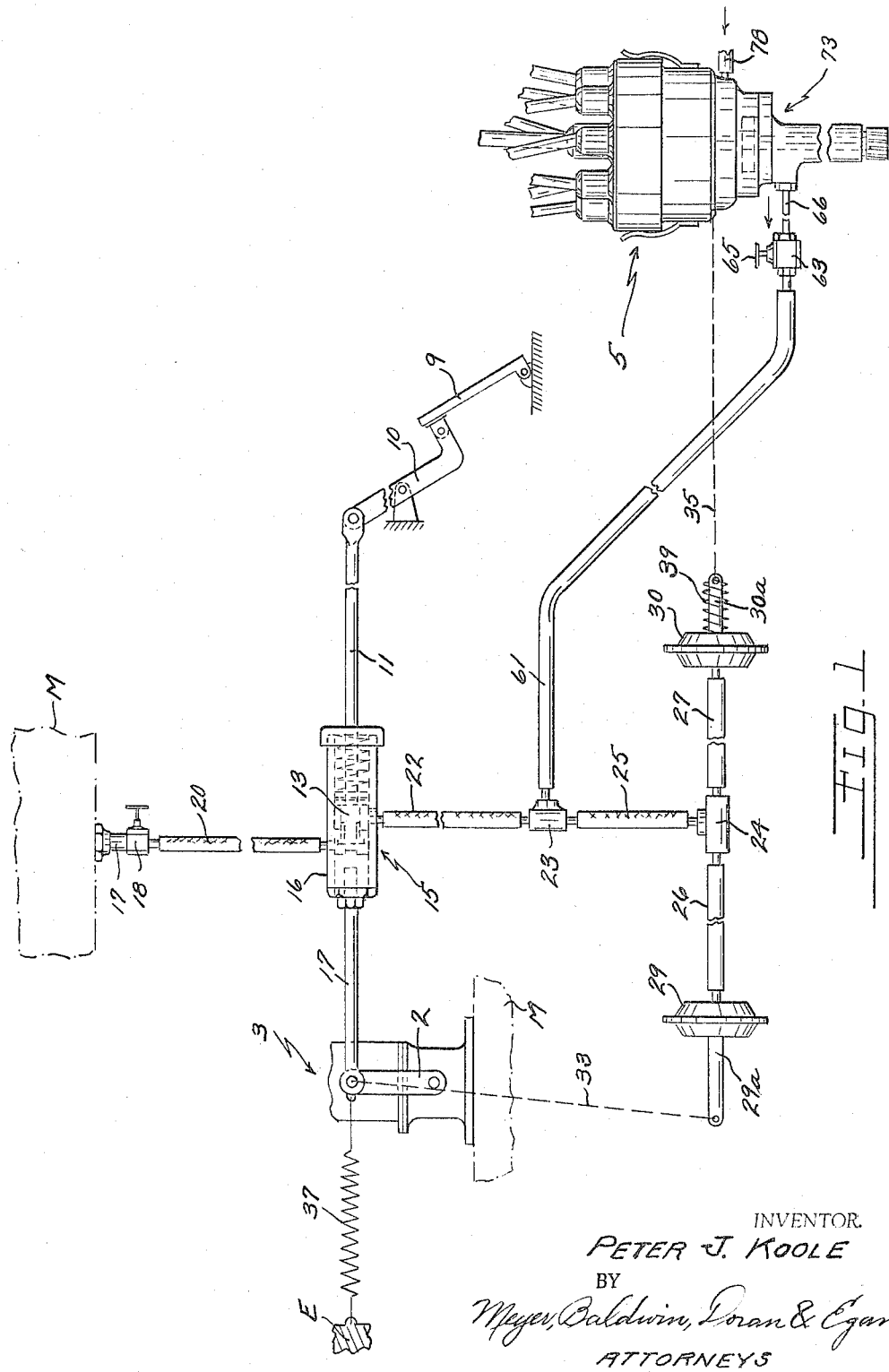
FIG. 1 is a diagrammatic representation of the engine control device embodying the present invention.

With reference now directed particularly to FIG. 1 of the drawings, the instant control device is seen to be incorporated into an engine control system which is connectable between the throttle lever 2 of a conventional downdraft type of carbureter 3 and the rotor breaker plate in a turret type of rotary adjustable distributor 5.

To accomplish this, the usual foot operated accelerator pedal 9 is suitably connected by pedal arm 10 and linkage 11 to one end of the valve body 13 of valve element 15 in the instant control device and from the housing of said valve element as indicated at 16, through connecting rod 17 to the free end of the carburetor accelerator lever 2 which, in turn, is connectable to the butterfly valve of the carbureter 3 being thus effective to rotate said butterfly valve and vary the amount of air passing downwardly through the body of the carbureter.

Figure 2:
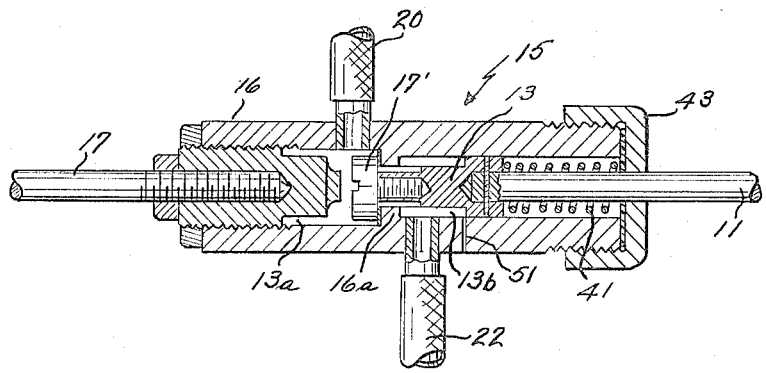
FIG. 2 is a longitudinal sectional view of the control valve of the instant device which is connectable between the throttle lever of the carbureter and the operator accelerator pedal.

The carbureter 3 is suitably mounted in its conventional position on the intake manifold of the engine as indicated diagrammatically by the reference character M, a second part of said manifold M being connected to one end of a flexible conduit 17, said conduit in turn connecting at its opposite end with a conventional shut-off or metering valve 18. Said valve, in turn, connects with one end of a flexible tubing 20, the opposite end of the latter connecting to the valve housing 16 so as to communicate with the valve chamber 13a thereof as best seen in FIG. 2. With this circuit, the vacuum conditions existing in the intake manifold M are likewise transmitted to said valve chamber 13a.

One end of a second flexible tubing 22 is likewise connectable at one end to the valve housing 16 so as to communicate with a second valve chamber 13b in said housing which is formed therein between an annular valve seat 16a and the body of the valve element 13.

A screw 17' is seen to be threaded into the end of the valve body, thus defining the valve head therefor, and which is adapted to seat upon said valve seat 16a thereby sealing the chamber 13a from chamber 13b.

The opposite end of the tubing 22 is connectable by a suitable T-fitting 23 and flexible tubing 25 to the T-junction 24 of flexible conduits 26 and 27.

The opposite end of conduit 26 is connected to a diaphragm motor 29 of conventional design and in like manner the opposite end of conduit 27 is connected to a diaphragm motor 30. Each of said motors is likewise suitably attached to the vehicle body.

Each of the diaphragm motors is preferably of the type having a flexible diaphragm suspended within a central chamber so as to be responsive to a change in pressure occurring on either side of said diaphragm.

The diaphragm of motor 29 has a rod 29a attached thereto and which extends outwardly of the motor housing, the free end of said rod connecting through suitable linkage as indicated diagrammatically at 33 to the aforementioned lever 2 of the carbureter 3.

The diaphragm of motor 30 likewise has a rod 30a attached thereto and which extends outwardly from its housing, the free end thereof, in turn, connecting through linkage 35 to the rotatable breaker plate of the distributor 5.

A suitable spring, as indicated at 37 is interconnected between the engine block as at E and the lever 2 being thus operable to urge the lever in a counterclockwise direction as viewed in FIG. 1 to thereby dispose the carbureter in its idle position. Thus, rod 17 is moved to the left, as viewed in FIGURE 1, into its idle position by spring 37.

A coil spring 39 is seen to be mounted over the rod 30a of the diaphragm motor 30, being interconnected between the motor housing and said rod so as to urge the same to the right as viewed in FIG. 1 to thereby position the distributor breaker plate in its idle position.

As best seen in FIG. 2, the linkage 11 extends into the valve housing 16 and is securely fastened to one end of the valve body 13. A coil spring 41 is disposed around the linkage 11 within the valve chamber 13b and is interposed between the housing cap 43 of the valve and the valve body 13, being thereby operative to urge said body and attached linkage 11 to the left as viewed in FIG. 2, whereby the valve head is spaced from the valve seat 16a in the idle position.

As likewise seen in FIG. 2, the valve chamber 13b is vented by port 51 to atmosphere, which port is closed when valve body 13 is in its idle or left position.

With the assembly as thus far described, in order to increase the engine speed, the operator may depress the throttle pedal 9 and pull the linkage 11 to the right as viewed in FIG. 1, effective to slide the valve body 13 to its closed position on valve seat 16a whereafter the complete valve assembly moves as a unit to the right with linkage 11. As a result, linkage 17 is likewise pulled to the right effective to swing lever 2 clockwise and rotate the butterfly valve in the carbureter 3 to its corresponding open accelerating position thereby providing the necessary air to the fuel being introduced into the engine. With the valve body 13 in its closed position the diaphragm motors are connected through valve port 51 to atmosphere, and hence the carbureter and distributor operate in the normal manner to provide the proper fuel mixture to the engine and the ignition thereof.

Thereafter, when the operator desires to decelerate the vehicle, he releases the throttle pedal 9 and the springs 37 and 41 return the lever 2 and valve body 13 to their respective idle position. Rod 17 is pulled to the left, and valve body 13 is moved to the left. As a result, the valve head of said valve body is moved away from the seat 16a to thereby connect the valve chambers 13a and 13b together. Said valve port 51 is likewise closed by the aforesaid body moving to its idle or left position.

When this occurs, the resultant increase in the vacuum occurring in manifold M—22 inches of mercury—is transmitted to the vacuum motors 29 and 30 whereby the rod 29a of motor 29 and connecting linkage 33 are effective to slightly open the butterfly valve in the carbureter 3, thus introducing air into the latter to mix with the heretofore mentioned "condensed fuel" and the idle fuel delivered by the carbureter in an effort to maintain the proper optimum fuel-to-air ratio for optimum burning. In like manner, the rod 30a of the motor 30 and connecting linkage 35 rotate the distributor breaker plate in such manner as to retard the spark to thereby time the ignition of the fuel so that it burns substantially completely without delivering power to the engine during the deceleration cycle.

When the diaphragm motors 29 and 30 undertake to regulate the operation of the carbureter 3 and distributor 5, the adjustment made thereto causes a resultant change to occur in the manifold vacuum, namely the vacuum begins to decrease in magnitude from its initial value of approximately 22 inches of mercury.

This change in vacuum magnitude in turn causes the diaphragm motors 29 and 30 to again make an adjustment in the operation of the carbureter and distributor, which adjustment causes a further reduction in the vacuum magnitude.

Inasmuch as the vacuum magnitude decreases as the engine speed also decreases the adjustment made to the carbureter and distributor by the aforesaid diaphragm motors and the resultant readjustment effected by the change in the operation of said carbureter and distributor functions to normally maintain optimum burning of the ignitable fuel delivered to the engine during the major portion of the deceleration cycle of the engine.

However, as the engine speed approaches its idle speed, it has been found that the decrease in engine speed is not proportional to the change caused in the vacuum magnitude by the said decrease, and consequently the vacuum operated diaphragm motors 29 and 30 have a tendency to over-adjust the carbureter and distributor so that the engine speed tends to increase.

To prevent this over-adjustment to said engine components, the instant control device includes means whereby, as the engine decelerates and approaches an idle speed, a predetermined quantity of air is introduced directly into the intake manifold independently of the carbureter so as to mix directly with the fuel passing through said carbureter to thereby retain an optimum burning ratio between the air and fuel, said introduction of air being likewise through the aforementioned vacuum circuit and thereby operable to disconnect the vacuum motors 29 and 30 from the manifold vacuum. In this manner said motors are rendered inoperable so as to enable the engine to return to its normal idle running condition.

Figure 3:
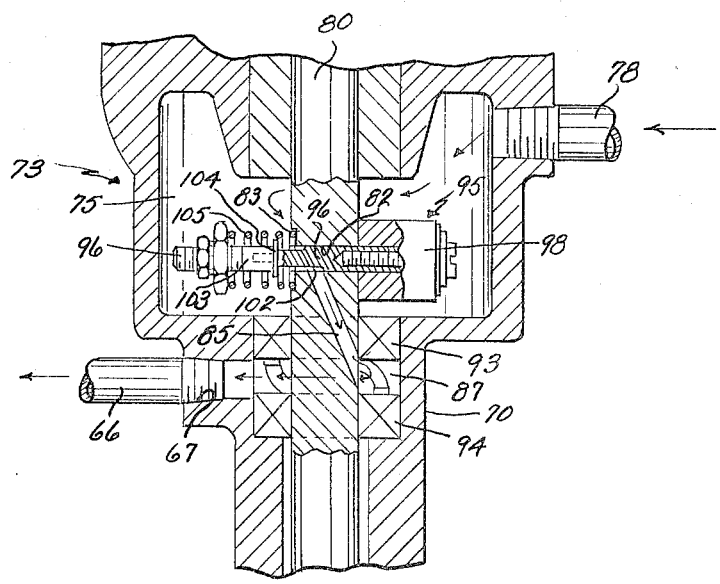
FIG. 3 is a vertical sectional view of a governor controlled valve which, in the instant control device, is adapted for use with a rotary type of distributor as is shown in FIG. 1.

With reference directed particularly to FIGS. 1 and 3, the aforementioned T fitting 23 is seen to have one end of a suitable flexible hose or the like, as indicated at 61, connected thereto so as to be in parallel communication with hoses 22 and 25, the opposite end of said hose 61 connecting to a conventional metering valve 63 having a rotatable valve element 65. Said metering valve 63 is connected in turn through conduit 66 to outlet port 67 formed in the housing 70 of a centrifugal valve as shown in its entirety at 73.

As best seen in FIG. 3, the valve housing 70 is provided with a central chamber 75 which communicates through a conduit 78 to atmosphere.

The centrifugal valve is seen to be mounted beneath the distributor 5 in such manner as to accommodate the rotor 80 of said distributor, said rotor preferably extending vertically downwardly through the valve chamber 75.

The distributor rotor is formed with a transverse port 82 surrounded by an annular recess defining a valve seat 83, said port connecting with one end of a channel 85 extending angularly downwardly through said rotor 80 and which communicates at its opposite end with housing chamber 87 connecting with the aforementioned outlet port 67.

Suitable sealing gaskets 93, 94 disposed in said housing 70 seal the chamber 87 from atmosphere.

A valve spool indicated in its entirety at 95 is seen to have its rod 96 disposed within the aforementioned transverse port 82, said rod having an enlarged head 98 suitably threadably attached thereto.

The rod is formed with a longitudinally extending groove 102 which is formed therein so as to communicate at one end with the aforementioned channel 85 and at the opposite end with the valve chamber 75 through the valve seat 83.

A sleeve 103 is seen to be threaded onto the rod 96 on the end thereof opposite the head 98, said sleeve, in turn, having an annular ring 104 formed on the inner end thereof, and which ring is of such diameter as to seat upon the valve seat 83, being thus effective to seal the groove 102 from the housing chamber 75.

A suitable coil spring 105 interposed between the sleeve 103 and the valve seat 83 is operable to urge the valve 95 to the left as viewed in FIG. 3 whereby the ring 104 is spaced from the valve seat 83 so as to normally connect the groove 102 and channel 85 with the housing chamber 75.

With this assembly, and with the engine operating at an accelerated or crusing speed, the distributor shaft 80 is rotated at a velocity sufficient to cause the valve member 95 to move by centrifugal force to the right as viewed in FIG. 3 against the pressure exerted by spring 105 to a position whereby the sleeve ring 104 seats firmly against valve seat 83 and seals the groove 102 and connecting channel 85 from the housing chamber 75. As a result, the flexible conduit 61, metering valve 65, conduit 66 and housing chamber 87 are vented to atmosphere through conduit 22 and valve port 51 such that the carbureter and distributor function in the usual manner.

Thereafter, when the operator releases the pedal 9 to initiate the deceleration of the engine, the valve 15 functions as above described to connect the diaphragm motors 29 and 30 to the manifold vacuum whereby the carbureter 3 and distributor 5 are periodically adjusted as the engine speed decreases to regulate the fuel mixture and its ignition.

During this interval, the rotational speed of the distributor shaft 80 is sufficient to retain the valve member 95 in its "closed" position on valve seat 83, thus sealing valve chamber 87 of the centrifugal valve 73 from atmosphere.

At a predetermined rotational speed of the distributor shaft 80 which, by way of example, may correspond to approximately 5–10 miles per hour in vehicle speed, the spring 105 overcomes the centrifugal force acting on the valve member 95 and moves said valve member to the left as viewed in FIG. 3 to its "open" position. As a result, the valve chamber 87 is connected to atmosphere through channel 85 and groove 102 whereby the above described vacuum circuit is purged or disrupted to render the diaphragm motors 29 and 30 inoperative. Thereafter, for the remaining part of the deceleration cycle, the operation of the carburetor and distributor are controlled by the conventional engine responsive elements, as will be understood.

With valve chamber 87 connected to atmosphere, a predetermined quantity of air, regulated by metering valves 63 and 18, is delivered through the valve 15 and connecting conduits 20 and 17 directly to the intake manifold M at a position therein below the carburetor 3 whereby said air is mixed with the fuel in said manifold to retain the optimum burning ratio of 15 to 1 therebetween.

In this manner, the instant control device enables the engine to decelerate smoothly to its idle speed while maintaining an optimum ratio of fuel to air during the complete deceleration cycle.

Having thus described a preferred embodiment it will be understood that the control device of the present invention is susceptible to various modifications and combinations of components without departing from the inventive concepts thereof as are defined in the claims.

What is claimed is:

1. In a control device for an internal combustion engine having an intake manifold, a carburetor connected to said manifold, a throttle valve in said carburetor for controlling the mixture of air and an ignitable fuel being supplied to said engine by said carburetor, and a distributor with a movable member for controlling the timing of the ignition of said fuel in said engine, said control device including a fluid motor means responsive to a high vacuum in said intake manifold for slightly opening said throttle valve and moving said member in the ignition retarding direction, said fluid motor means being operable to cause more complete burning of fuel in said engine during deceleration of said engine without a corresponding increase in the power output of said engine, the improvement comprising: a conduit means for communicating said fluid motor means with a source of pressurized air, a valve means in said conduit means, said valve means being responsive to the speed of said engine with said valve means being closed at all speeds above a preselected control speed, said control speed being slightly higher than a preselected idle speed for said engine, and being opened at all speeds below said preselected control speed whereby said fluid motor means are rendered inoperative when said engine speed is below said control speed, a foot operated pedal member and a rod connecting said pedal member with said throttle valve, movement of said rod by said pedal member in a first direction opening said throttle valve to accelerate said engine and release of said pedal member allowing said rod to be moved by a spring means in a second direction closing said throttle valve to decelerate said engine, and a second valve means closed when said rod is moved in said first direction and open when said rod is moved in said second direction to the throttle valve closed position of said rod, said second valve means being positioned between said manifold and said fluid motor means whereby said motor means is inoperative when said second valve means is closed, said second valve means being mounted on said rod and a first flexible conduit connecting said manifold with said second valve means and a second flexible conduit connecting said second valve means with said fluid motor means.

2. In a control device for an internal combustion engine having an intake manifold, a carburetor connected to said manifold, a throttle valve in said carburetor for controlling the mixture of air and an ignitable fuel being supplied to said engine by said carburetor, and a distributor with a movable member for controlling the timing of the ignition of said fuel in said engine, said control device including a fluid motor means responsive to a high vacuum in said intake manifold for slightly opening said throttle valve and moving said member in the ignition retarding direction, said fluid motor means being operable to cause more complete burning of fuel in said engine during deceleration of said engine without a corresponding increase in the power output of said engine, a foot operated pedal member, and a rod connecting said pedal member with said throttle valve, movement of said rod by said pedal member in a first direction opening said throttle valve to accelerate said engine and release of said pedal member allowing said rod to be moved by a spring means in a second direction closing said throttle valve to decelerate said engine, the improvement comprising: a valve means closed when said rod is moved in said first direction and opened when said rod is moved in said second direction to the throttle valve closed position of said rod, said valve means being positioned between said manifold and said fluid motor means whereby said motor means is inoperative when said valve means is closed, said valve means being mounted on said rod and a first flexible conduit connecting said manifold with said valve means and a second flexible conduit connecting said valve means with said fluid motor means.

References Cited by the Examiner

UNITED STATES PATENTS

| | | | |
|---|---|---|---|
| 2,506,511 | 5/1950 | Mallory | 123—97 |
| 2,621,482 | 12/1952 | Meade | 123—117.1 |
| 2,988,074 | 6/1961 | Lobdell et al. | 123—97 |
| 3,027,884 | 4/1962 | Bale et al. | 123—97 |

MARK NEWMAN, *Primary Examiner.*

LAWRENCE M. GOODRIDGE, *Examiner.*

CARLTON R. CROYLE, *Assistant Examiner.*